April 19, 1960 J. G. ALTHOUSE 2,932,886
PRODUCTION OF CLAD STEEL PLATES BY THE 2-PLY METHOD
Filed May 28, 1957

INVENTOR.
Joseph G. Althouse.
BY
Daniel E. Igo
Attorneys.

United States Patent Office 2,932,886
Patented Apr. 19, 1960

2,932,886

PRODUCTION OF CLAD STEEL PLATES BY THE 2-PLY METHOD

Joseph G. Althouse, Coatesville, Pa., assignor to Lukens Steel Company, Coatesville, Pa., a corporation of Pennsylvania Application May 28, 1957, Serial No. 662,121

3 Claims. (Cl. 29—471.5)

The present invention is addressed to the production of clad steel plates, particularly in heavy thicknesses.

One of the principal objects of the invention is to provide an improved process for producing clad steel plates having an excellent bond between the different metals.

A further purpose is to provide a method of making a rolled steel plate surface free of deleterious imperfections.

An additional object is the provision of a method which includes the steps of incorporating the cladding components, as well as a new method for heating the assembled, welded pieces prior to rolling into plate.

Still another object is to provide an improved procedure for cladding all types of carbon or low alloy steel with both austenitic and ferritic stainless steels. The insert alternatively may be composed of nickel, Monel metal and other non-corrosive metals and alloys of the same nature which are capable of being bonded with steel by the hot rolling process.

Other objects will appear hereinafter throughout the specification.

Figure 1:
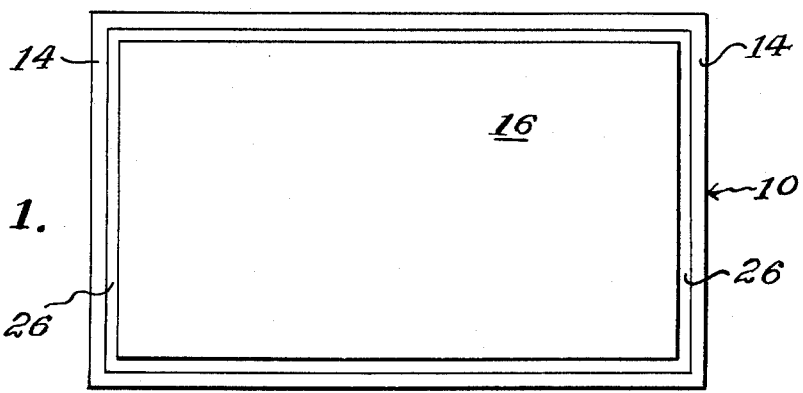
Figure 1 is a top plan view of a clad metal plate.

Preferably the 2-ply assembly process of this invention includes the insertion of the cladding metal slab into one or both surfaces of a base metal steel slab, the plane surface of which has been made smooth and clean by machining and blast-cleaning steps. A lip, usually approximately one-third of the thickness of the cladding slab, projects above the surface around the outside edges of the slab used for the assembly. This lip is by way of example, between 1" to 2" wide and it may consist of the metal left on the slab after the machining operation, or the lip can be welded around the edges of the base slab by using a steel bar, which latter may be welded to the upper plane surface of the slab around the peripheral edges thereof. A recess, which may be of approximately ¼" is permitted between the inside of this projecting lip and the side edges of the cladding metal slab, to provide a space for the deposit of a weld bead of proper dimensions, for sealing the edges of the cladding slab to the base metal steel slab. This welding seal is made to prevent oxidation of the bonding faces of the cladding metal and base metal slabs during heating and rolling.

Referring now to the drawing, the carbon or alloy steel slab is indicated by the numeral 10. This base slab is provided with a machined upper surface 12 and a lip 14 which extends peripherally along the upper side edges thereof.

The cladding metal slab, shown at 16, has a machined base surface 18 which is adapted to lie in face to face engagement with the machined upper surface of the base metal slab. A recess shown at 20 extends between the inner sides 22 of the lip 14 and the outer sides 24 of the cladding metal slab.

The recess 20 is filled with welding material 26 so as to seal the confronting faces 12 and 18 to thereby prevent oxidation of these bonding faces during the heating and rolling of the clad steel plate.

Figure 3:
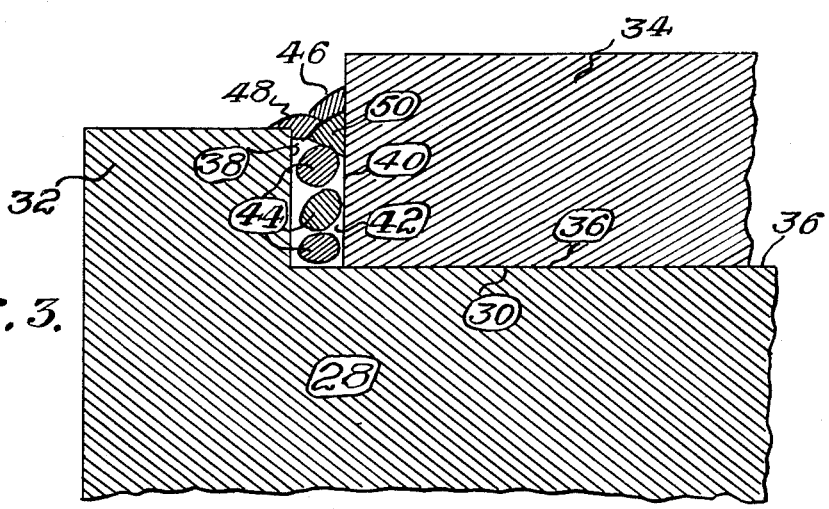
Figure 3 is a vertical section partly broken away of a second form of a clad steel plate produced by an alternative method of the invention.

As shown in Figure 3 which discloses an alternate method, the base slab 28 is provided with a machined upper surface 30 and a lip 32. The clad metal slab which is shown at 34 is provided with a lower machined surface 36 which is in face to face engagement with the upper surface 30 of the base slab.

The inner side edges of the lip 32 are indicated at 38. These side edges face the insert slab side edges 40. These surfaces are machined so as to leave a space 42 between the said side edges, on all four sides. Each space is filled with a plurality of cylindrical rods 44. These rods may be composed of the same material as the base slab or that of the insert slab, or they may be of a different material altogether. Preferably the diameter of the rods is substantially that of the space 42 so that the rod peripheries substantially engage the side walls 38.

A plurality of seal welds 46, 48 and 50 extends across the space between these side walls so as to form a seal between the side edges 38 and 40. The rods, of which there may be any suitable number from one to several, act as a backing-up metal for depositing the sealing weld beads around the entire periphery of the seal. The rods also take care of the expansion of the stainless steel or other metal insert, during the heating operation. This expansion in the case of the insert is of such magnitude as to cause the rods to be deformed from their round cross section to an oval or flat cross section. The pressure of the insert, as its sides expand during the heating operation, will not only flatten these rods, but pressure weld them to the side walls 38 and 40 of the lip and insert slab respectively, thereby further effecting a seal for protecting the bonding surfaces 30 and 36 of the assembled slab, during the heating and rolling operations in the formation of the plate.

The assembled and seal-welded slab as shown in either figure of the drawings is heated uniformly to a relatively low temperature of approximately 1900° F., with a margin of 100° F. on either side of this temperature, for a period of several hours. The assembled slab is then rolled by the use of several light rolling passes to reduce the thickness of the slab by between 1½" to 3". The hot slab is then re-charged to a temperature of 2050° F., with a margin of 100° F. plus or minus of this temperature, for a period of not over seven hours. The slab is then re-rolled to the final plate thickness by using standard rolling practice.

By following this procedural method, it has been found that a uniform and continuous bond exists between the cladding and base metal slab, this bond being accomplished on the first heating and rolling steps. The second heating ensures sufficient plasticity of the material to achieve by rolling, the final thickness of the required plate.

One of the new and unexpected results of the initial low heating temperature and reduced heating time is the prevention of excessive scaling of the base metal slab. A further result is, that the low heating temperature and reduced heating period prevents excessive scaling and oxide penetration of the stainless steel or other cladding material used. When using prior methods, this excessive scaling and oxide penetration resulted in checked or defective surfaces of the finally rolled clad plate.

Another advantage obtained by using the present heating method is that it increases the yield of the bonded plate material in an amount up to 33% more than is obtained by the present 4-ply or 3-ply method. Another important result is that under the present method it is possible to use less backing material, for a given stainless steel insert, in order to obtain the plate pattern desired. A further advantage of using the present heating method is that because of the lower heating temperatures uesd for the initial rolling step and in the final rolling step, less scale is raised on both the insert and the base steel surfaces than would be obtained on the 2-ply assembled slabs produced in accordance with former accepted practices.

The present method is of particular advantage, in the production of heavy gauge plates such as those of three or more inches of thickness. The sizes of the plates obtained with the instant method are much larger than those obtained by methods of the prior art which limit the plate sizes because of the excess material which is required for the assembly of the slabs for the rolling operation. This excess material is not necessary when practicing the method of this invention. Restriction of the cladding slab thickness such as would be necessary in prior art methods is not present in the instant method, since any thickness or percentage of cladding may be obtained by the method of this invention.

A further advantage of using the method herein described is that the barrier around the base metal slab acts as a support and an expansion joint, the weld metal seal being under compression during the heating step instead of being under tension as in the conventional 2-ply method. The lip around the periphery of the base metal slab during the heating may move outwardly because of the fact that the steel insert slab has a greater coefficient of expansion than that of the base slab. This results in increasing the effectiveness of the weld seal around the periphery of the slab.

The weld seal, because of its small size, may be deposited by hand welding, although a proper automatic weld bead may be used after the first hand-sealed bead has been deposited, in order to act as a back-up strip and to prevent the contamination of the bonding surfaces. The smaller amount of weld metal which may be used to effect the seal in the present method will be an economy over the larger welds now used for the present 4-ply, 3-ply, or even the present 2-ply methods of assembly.

Figure 2:
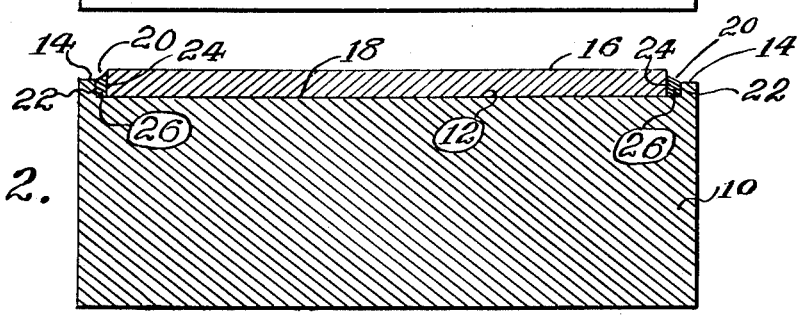
Figure 2 is a vertical section of a clad steel plate produced by the present method.

Referring now to the alternative method, attention is called to Figure 3, wherein the base metal slab is prepared by machining a land which is approximately ⅔ the depth of the thickness of the cladding material. In other words, the depth of the surface 12 in Figure 2 and that of the surface 30 in Figure 3 is approximately ⅔ the thickness of the cladding slab 16 (Figure 2) or 34 (Figure 3). The recess 20 in Figure 2 and 42 in Figure 3 extends between the outer side edges of the insert and the inner side edges of the lip on all four sides. When practicing the method shown in Figure 3, metal rods of either stainless steel or carbon steel or alloys of these steels are inserted in the space between the lip and the side edges of the insert, and one or more rods may be used in each of the four recesses.

These rods act as a backing-up metal for depositing the sealing weld beads around the entire periphery. They also take care of the expansion of the steel insert slab during heating. This expansion is of such magnitude as to cause the rods to deform from a round to an oval or even to a flat shape in cross section, the pressure also serving to weld the side edges of the insert slab to the lip of the base metal slab, thereby effecting a further seal than the seals provided by the seal welds 46, 48 and 50. The sealing effect of the rods will further protect the bonding surfaces from oxidation during the heating steps above stated.

The above description and drawings disclose several methods which may be used in practicing the invention, and specific language has been employed in describing the same. It will, nevertheless, be understood that no limitations of the scope of the invention are thereby contemplated, and that various alterations and modifications in said inventive steps may be used such as would occur to one skilled in the art to which the invention relates.

What is claimed is:

1. A method of producing a heavy clad steel plate comprising forming a base metal steel slab having a depression formed by a raised portion extending laterally from the side edges thereof, assembling in said depression a cladding slab of a non-corrosive metal having a higher coefficient of expansion than that of said base slab and having a thickness substantially greater than the depth of the depression, leaving a recess between the raised portions of said base slab and the side edges of said cladding slab, the depth of the raised portion from the base of the depression being approximately two-thirds the thickness of the cladding slab after assembly, at least partially filling said recess with malleable metal rods, at least some of said rods being of a diameter to substantially fill said recess, sealing said recess by depositing welding material in said recess over said rods, heating the assembly to a temperature of between approximately 1800° F. and 2000° F., and causing said rods to be distorted due to the expansion of the sides of said cladding slab, lightly rolling the assembly until the thickness of the assembly has been reduced in thickness, reheating the assembly at a temperature of between 1950° F. to 2050° F., and rerolling the assembly to final plate thickness.

2. A method of producing a heavy clad steel plate comprising forming a base metal steel slab having a depression formed by a raised portion extending laterally from the side edges thereof, assembling in said depression a cladding slab of a non-corrosive metal having a higher coefficient of expansion than that of said base slab and having a thickness substantially greater than the depth of the depression, leaving a recess between the raised portions of said base slab and the side edges of said cladding slab, the depth of the raised portion from the base of the depression being approximately two-thirds the thickness of the cladding slab after assembly, at least partially filling said recess with malleable metal rods at least some of said rods being of a diameter to substantially fill said recess, the said rods being of the same material as the material of said cladding slab, sealing said recess by depositing welding material in said recess over said rods, heating the assembly to a temperature of between approximately 1800° F. and 2000° F., and causing said rods to be distorted due to the expansion of the sides of said cladding slab, lightly rolling the assembly until the thickness of the assembly has been reduced in thickness, reheating the assembly at a temperature of between 1950° F. to 2050° F., and rerolling the assembly to final plate thickness.

3. A method of producing a heavy clad steel plate comprising forming a base metal steel slab having a depression formed by a raised portion extending laterally from the side edges thereof, assembling in said depression a cladding slab of a non-corrosive metal having a higher coefficient of expansion than that of said base slab and having a thickness substantially greater than the depth of the depression, leaving a recess between the raised portions of said base slab and the side edges of said cladding slab, the depth of the raised portion from the base of the depression being approximately two-thirds the thickness of the cladding slab after assembly, at least partially filling said recess with malleable metal rods at least some of said rods being of a diameter to substantially fill said recess, the said rods being of the same material as said base metal steel slab, sealing said recess by depositing welding material in said recess over said rods, heating the assembly to a temperature of between approximately 1800° F. and 2000° F., and causing said rods to be distorted due to the expansion of the sides of said cladding slab, lightly rolling the assembly until the thickness of the assembly has been reduced in thickness, reheating the assembly at a temperature of between 1950° F. to 2050° F., and rerolling the assembly to final plate thickness.

References Cited in the file of this patent

UNITED STATES PATENTS

| | | |
|---|---|---|
| 1,997,538 | Armstrong | Apr. 9, 1935 |
| 2,145,248 | Chace | Jan. 31, 1939 |
| 2,173,109 | Hamblin | Sept. 19, 1939 |
| 2,395,877 | Keene | Mar. 5, 1946 |
| 2,464,163 | Weesner et al. | Mar. 8, 1949 |
| 2,468,206 | Keene et al. | Apr. 26, 1949 |
| 2,718,690 | Ulam | Sept. 27, 1955 |
| 2,737,710 | Noble et al. | Mar. 13, 1956 |
| 2,813,333 | Pompa | Nov. 19, 1957 |